United States Patent [19]
Kemp, III

[11] Patent Number: 6,082,651
[45] Date of Patent: Jul. 4, 2000

[54] LIGHTWEIGHT SPINNING REEL WITH LARGE DIAMETER SPOOL

[76] Inventor: Fred M. Kemp, III, 912 Leonard, Rock Hill, Mo. 63119

[21] Appl. No.: 09/111,916

[22] Filed: Jul. 8, 1998

[51] Int. Cl.[7] .................................................. A01K 89/00
[52] U.S. Cl. ........................................... 242/322; 242/224
[58] Field of Search .................................... 242/322, 324, 242/230, 231

[56] References Cited

U.S. PATENT DOCUMENTS

| | | | |
|---|---|---|---|
| 5,524,831 | 6/1996 | Carlson | 242/224 X |
| 5,829,699 | 11/1998 | Tsutsumi | 242/322 X |

OTHER PUBLICATIONS

Browning product catalog, Spinning Reels, pp. 1–5, Jul. 1986.
Daiwa Product Catalog, Spinning Reels, pp. 2–15, 1987.
Shakespeare product catalog, Spinning Reels, pp. 34–41, 1987.
Ryobi Fishing Tackle for 1987, Spinning Reels, pp. 10–21, 1987.
Shimano Tomorrow's Tackle Today, Spinning Reels, pp. 22–31, 1987.
1997–1998 Daiwa Fishing Tackle, Spinning Reels, pp. 1–12, 1997.

*Primary Examiner*—Donald P. Walsh
*Assistant Examiner*—Emmanuel M. Marcelo
*Attorney, Agent, or Firm*—Polster, Lieder, Woodruff & Lucchesi, L.C.

[57] ABSTRACT

An improved light weight, fixed spool spinning fishing reel allowing versatility in line sizes, longer casts, and less line twist. The fishing reel includes a spool with a generally cylindrical channel extending between the opposite faces. The outer face has a diameter of greater than two inches. The fishing reel, including the spool, has an overall weight of less than nine and one half ounces.

18 Claims, 3 Drawing Sheets

LIGHTWEIGHT SPINNING REEL WITH LARGE DIAMETER SPOOL

CROSS-REFERENCE TO RELATED APPLICATIONS

None

STATEMENT REGARDING FEDERALLY SPONSORED RESEARCH OR DEVELOPMENT

Not Applicable.

BACKGROUND OF THE INVENTION

1. Field of the invention

This invention relates to fishing reels and more particularly to open face spinning reels of the fixed spool type. The invention applies more specifically to a ratio of overall reel weight to spool diameter that allows the effective use of a wide variety of line sizes, longer casts, and the effects of line twist and memory to be minimized.

2. Description of the Prior Art

The known prior art does not lend itself to versatility in varying fishing line strengths nor does it attempt to deal with the problem of the inability of an angler to use significantly different line strengths (also known as line test, line size, or line diameter) for any one particular reel. This lack of practical versatility is a function of spool diameter and overall reel weight. Excessively small diameter spools or excessively heavy reels has limited the prior art to an unnecessarily small range of usable line strengths.

Heretofore, to upsize or downsize line strengths on a reel compromised comfort or performance. For example, a fisherman utilizing the prior art cannot use a small reel, with its small diameter spool, for a higher line strength application. In addition, it is undesirable to use a reel with a large diameter spool for an application requiring smaller line strengths because of the excessively heavy weight of all prior large diameter reels. This versatility in upsizing or downsizing line strengths is desirable when fishing conditions change, a different species is sought after, a different body of water is fished, different lures or bait is used, etc.

Fishing lines, particularly plastic monofilament lines, have a tendency to unfurl or uncoil off a spool. A fishing line's characteristic "memory" or predisposition to either straighten out, in the case of new line, or to stay coiled, in the case of older line causes this tendency. Line memory can also be exacerbated by twist in the line. In short, smaller spool diameters cannot effectively handle larger line sizes.

Casting distance is highly desirable and historically sought after in prior art. Despite varying spool designs (including a longitudinally varying spool diameter), various line wrapping techniques, varying line wrapping angles, and other methods designed to increase casting distance, there is room for improvement.

However, the prior art that does feature larger diameter spools has unfortunately also been characterized by excessive overall reel weight. Excessive reel weight is undesirable to a fisherman using smaller line sizes. This is because a heavy reel is inappropriate for the lighter lines, more delicate rods and smaller lures used for certain species and fishing conditions.

The net effect of these problems is that a fisherman who plans to use varying line sizes needs to either purchase more than one reel, limit the breadth of line weights used and applications used for any particular reel, or use a heavier than desired reel that features a large diameter spool. There is room for improvement in this regard.

Another problem associated with prior art is line twist. In addition to the above referenced exacerbation of line memory, line twist by itself presents a variety of fishing problems. Line twist is generally caused by two factors. The first is the process inherent to wrapping a line around a fixed spool and is caused by the action of the reel itself. The second source of line twist is external to the action of the reel and is caused by the twisting tendency of lures in action both in the water and tumbling through the air during a cast. Minimizing line twist and, more importantly, the effect of line twist has been a goal of many prior art improvements but there is room for improvement in this regard.

Furthermore, a high line retrieve rate per turn of the handle is highly desirable. Prior art designs utilizing smaller diameter reels require higher rotor speeds to retrieve a given amount of line. Among other things, higher rotor speeds may require a larger gearbox, increase the effect of a rotor imbalance and cause unnecessary wear on components.

BRIEF SUMMARY OF THE INVENTION

Among the several objects and advantages of the present invention include:

The provision of new and improved fixed spool spinning fishing reels;

The provision of such spinning reels with increased versatility to allow for greater variation in line weight, fish type and conditions utilizing the same fishing reel;

The provision of a fixed spool spinning reel allowing superior casting distance;

The provision of a fixed spool spinning reel designed to decrease wear of internal parts; and decrease the effect of rotor imbalance.

The provision of a fixed spool spinning reel which promotes less line twist when retrieving fishing line and minimizes the effects of line twist when present.

The provision of a fixed spool spinning reel which reduces both the cause and effects of line memory problems.

Briefly stated, the large spool, light weight spinning fishing reel of the present invention has a total weight to spool ratio significantly smaller than that of a conventional reel. Preferably, the spool has a diameter of two and one-quarter inches and a weight of seven to nine ounces.

The ratio of the overall weight of the fishing reel to the diameter of the spool is approximately on the order of 4.0:1 or less for spool diameters between 2" and 2.6".

Preferably, the overall ratio of the spool weight to the spool diameter is on the order of 3.75:1 or less for spool diameters between 2" and 2.6".

The fishing reel may include an anti-reverse mechanism and/or a drag mechanism. The fishing reel may be composed of a graphite or other plastic material, or be made of a metal alloy containing for example without limitation titatuim or aluminum or both. The fishing reel may utilize a worm gear, cam lobe or other line wrapping method.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

Figure 1:
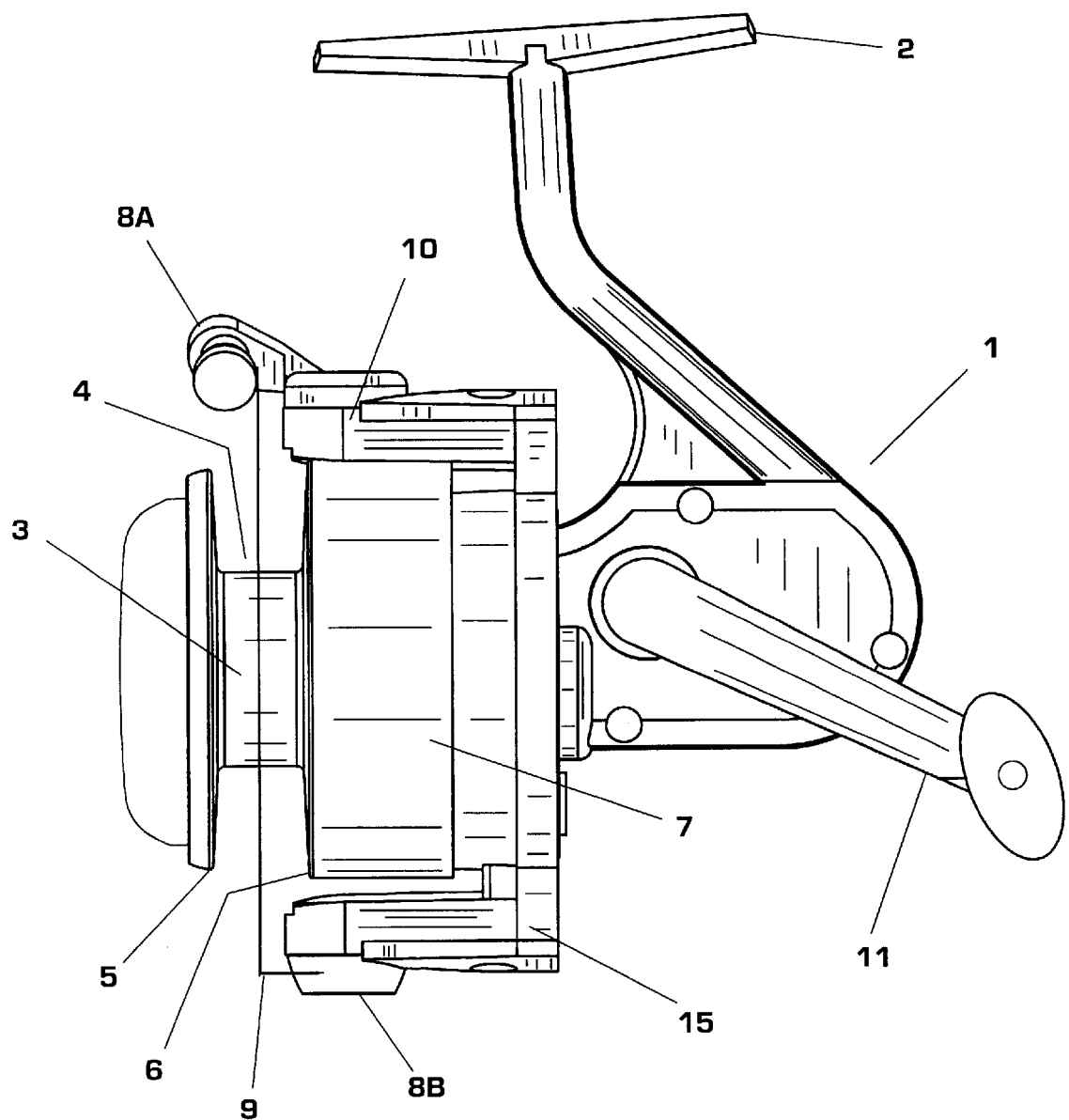
FIG. 1 is a spinning reel of the present invention in side elevation.

A spinning reel according to the present invention is illustrated in FIG. 1. Referring to FIG. 1, the spinning reel 1 includes a mounting leg or shoe 2 to affix the reel to a fishing pole (not shown). Such means are well known in the art and form no part of the present invention. A spool 3 comprises an central, cylindrical portion or channel 4, an outer face 5, and an inner face 6. In this preferred embodiment, inner face 6 is part of skirt 7. Skirt 7 partially fits over the rotor (or rotating cup) of reel 1, and helps to prevent fishing line (not shown) from becoming entangled with the rotor (or rotating cup) of reel 1. A line retrieval mechanism, in the case of the preferred embodiment a rotating cup 10, sometimes referred to as the rotor arms, partially surrounds spool 3. A bail wire or simply "bail" 9 extends across the front of reel 1, and is attached to bail pickup bracket 8A and bail wire receiving bracket 8B at each side of cup 10. Rotating cup 10, bail wire 9, bail pickup bracket 8A and bail wire receiving bracket 8B combined are Rotor 15. Reel 1 is commonly referred to as an "open face" type, meaning that a bail pickup bracket 8 pivots bail 9 to automatically swing over the "face" or front of the reel when the handle 11 is cranked to recoil fishing line (not shown) around the spool 3. This is in contrast to another type of spinning reel, known as a "closed face" spinning reel, where a shroud covers the front end of the reel.

Figure 2:
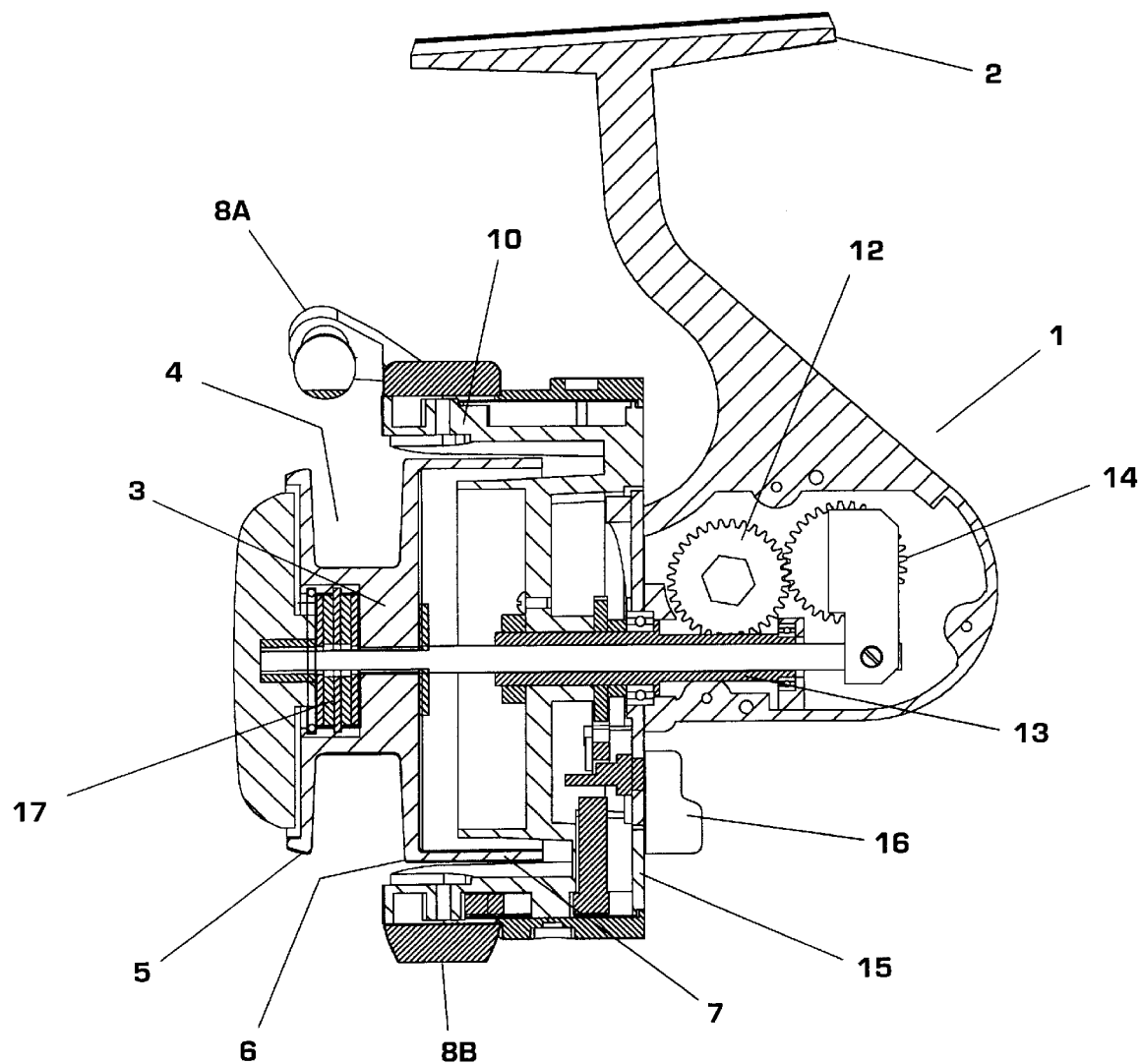
FIG. 2 is a cross section of a spinning reel of the present invention in side elevation.

Referring to FIG. 2, reel 1 includes a handle 11 mounted to a drive mechanism, which in the preferred embodiment includes an internal drive gear 12 and a pinion gear 13. In the preferred embodiment of the present invention, internal drive gear 12 has thirty-two teeth. Internal drive gear 12 is operably engaged to pinion gear 13, mounted at right angles to internal drive gear 12. In the preferred embodiment of the present invention, the pinion gear 13 has seven teeth. Thus, a gear ratio of about 4.57:1 is preferred. Pinion gear 13 is attached to rotating cup 10. As handle 11 is cranked, internal drive gear 12 turns pinion gear 13, which in turn rotates rotating cup 10. As rotating cup 10 turns, bail 9 engages a fishing line (not shown), and wraps the fishing line around spool 3. Internal drive gear 12 is also attached to castoring gear 14, which is oriented in the same plane as internal drive gear 11. Castering gear 14 acts to move spool 3 in and out in a reciprocating fashion when handle 11 is cranked, thus causing fishing line (not shown) to be retracted and laid in an even fashion over spool 3.

In the preferred embodiment of the present invention, gears 12, 13 and 14 are machined helical gears. These gears are stronger and smaller than other gear types commonly used in fishing reels, thus reducing the overall size and weight of reel body 1.

An anti-reverse mechanism with switch 16 is present and is located at the front of reel body 1 in the preferred embodiment. This mechanism is in all respects conventional. The anti-reverse mechanism acts to prohibit the rotating cup 10 from moving in a reverse direction, that is to say in a direction that allows more fishing line from being released.

The preferred embodiment also includes a drag mechanism, including drag disks 17, whereby the spool 3 is allowed to move in response to a load being placed on the fishing line, as in when a fish strikes a lure attached to the end of the fishing line. This drag mechanism is likewise conventional in structure and function.

Figure 3:
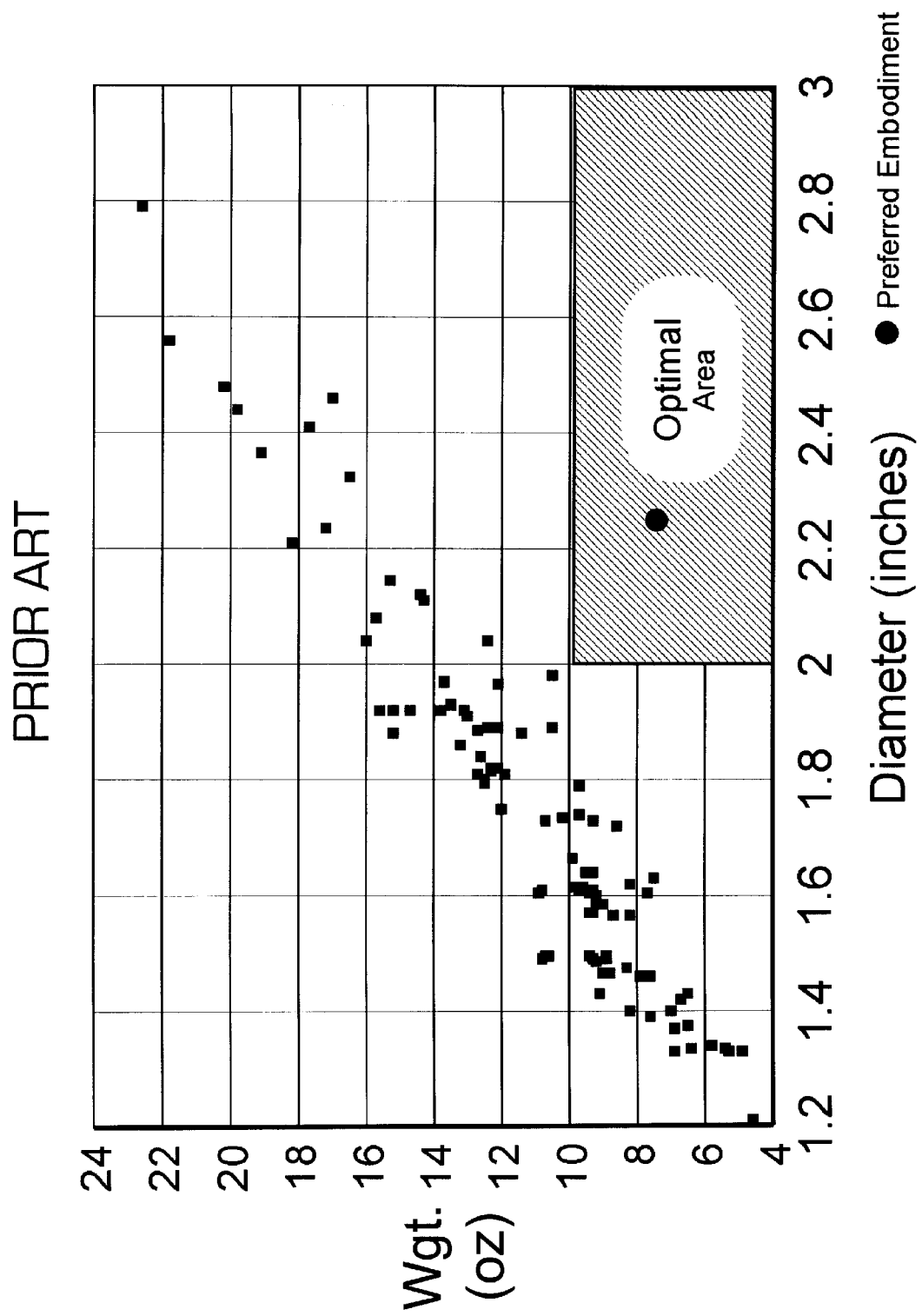
FIG. 3 is a diagram showing the relative weights and spool sizes of a representative sample of 104 prior art devices and of the present invention.

Referring now to FIG. 3, it can be seen that prior art fishing reels (shown as squares) increase in weight as a function of spool size in an almost linear fashion. The fishing reel of the present invention, in contrast, contradicts this with a much lower ratio of weight to spool diameter. The prior art fishing reels were measured and weighed, then compared to an embodiment of the present invention (noted as a circular point). It is believed that no other open faced spinning fishing reel has possessed the particular weight and spool size ranges of the present invention. It has been found that the certain unique range of spool diameters and overall reel weights as shown in the shaded area in FIG. 3 is optimal for versatility and is unique to all other spinning reels. This is in sharp contrast to traditional spools, which vary in diameter in anticipation of line weights used. Put another way, the prior art has taught that individual reels are used for specific and limited kinds of fishing activities. The range tested and shown in FIG. 3 dismisses that notion and solves the versatility problem not recognized by the prior art. It is worth noting that the prior art has been a very crowded field in the last five decades.

Weight as referred to herein means overall weight of the entire fishing reel ready to be used for fishing, less fishing line. Spool diameter means the largest diameter of outer face 5 (or any other parts forward of face 5) and not channel 4 inner face 6 or skirt 7 diameter in FIG. 1. The dimensions of other parts of the spool assembly both forward and rearward of outer face 5 may vary in different embodiments of this invention.

In the present invention, the weight of the entire reel body, including the spool, is less than ten ounces. In the preferred embodiment, the weight of the entire reel is between seven and nine ounces. The outer face 5 of spool 3 is relatively large in diameter, preferably over two inches in diameter and most preferably at least two and one-quarter inches in diameter.

In addition to versatility, the range as depicted in FIG. 3 provides for longer casting lengths. This is due in part to the tendency of fishing line to acquire a "memory," that is to retain a coiled shape after being spooled. As the line is cast out, this tendency to remain coiled results in a sigmoidal shape as the line leaves a spool. With the larger diameter spool 3, larger coils are formed and thus the sigmoidal shape of the line has a longer period when cast, more closely resembling an optimal straight line.

Reducing line memory and its associated problems is another distinct advantage.

It is known that line twist and its effects are reduced as spool diameter is increased. Lighter line enthusiasts, however, will see this advantage for the first time with the present invention.

Additionally, the larger spool diameter, in combination with the gear ratio of about 4.57:1 allows fishing line to be retracted at a rate of approximately thirty-three inches per revolution of handle 11. This rate is high in comparison to most fishing reels, and results in quicker line retrieval and less wear to the moving parts of reel 1. The effect of Rotor 15 imbalance is also reduced with lower rotational speeds.

Accordingly, what has been described is an improved spinning fishing reel that allows practical versatility in line sizes not seen elsewhere. Unique combinations of spool diameters and overall reel weights accomplish this where all other reels have failed.

In addition, casting distances are improved. Another significant advantage is that the causes and effects of line memory and line twist are also reduced substantially.

In view of the above, it will be seen that the several objects and features of this invention are achieved in other advantageous results obtained. For example, the channel 4 could have a varying diameter; drag parts can be in different locations; gear types and sizes can vary; line wrapping can be effected by a worm gear, cam lobe, or some other method; the bail assembly could incorporate more or less parts, and the outer face 5 could have various profiles or even shapes other than a circular shape. In addition, the reel 1 could be made of any combination of materials that produce the same unique combinations of spool diameters and overall reel weights, such as metal alloys, composite plastics, or coated materials, for example. These examples illustrative only and are not exhaustive.

As various changes could be made in the above constructions without departing from the scope of the invention, it is intended that all matter contained in the above description as shown in the accompanying drawings shall be interpreted as illustrative and not in a limiting sense. Thus the scope of the invention should be determined by the appended claims and their legal equivalents, rather than by the examples given.

Reference numerals in drawings

| REFERENCE NUMERALS IN DRAWINGS | |
|---|---|
| 1 spinning reel | 9 bail |
| 2 mounting shoe | 10 rotating cup |
| 3 spool | 11 handle |
| 4 channel | 12 internal drive gear |
| 5 outer face | 13 pinion gear |
| 6 inner face | 14 castering gear |
| 7 skirt | 15 rotor |
| 8A bail pickup bracket | 16 anti-reverse switch |
| 8B bail wire receiving bracket | 17 drag disks |

What is claimed is:

1. A versatile, light weight fishing reel for carrying a variety of fishing line weight sizes including:
   a spool having opposite faces comprising an inner face and an outer face with a generally cylindrical channel extending between the opposite faces;
   the outer face having a diameter greater than two inches but less than five inches for carrying either light or heavy test weight fishing line;
   the fishing reel, including the spool having an overall weight of approximately nine and one half ounces or less; and
   the combination of the diameter of the outer face of said spool coupled with the weight of said reel providing the versatile, lightweight fishing reel for a variety of fishing line weight sizes.

2. The fishing reel of claim 1 wherein the outer face of said spool has a diameter of at least two and one quarter inches, and said fishing reel, including the spool has an overall weight of approximately ten ounces or less.

3. The fishing reel of claim 1 further including an anti-reverse mechanism.

4. The fishing reel of claim 1 further including a drag mechanism.

5. The fishing reel of claim 1 wherein the spool is composed essentially of a graphite composite material.

6. The fishing reel of claim 1 wherein the spool is composed of a metal alloy.

7. A light weight fishing reel for carrying either light weight fishing line or heavy weight fishing line comprising:
   a spool having opposite inner and outer faces with a generally cylindrical channel extending between the opposite faces, said spool being constructed with a predetermined diameter along its outer face to carry either light weight test fishing line or heavy weight test fishing line; and
   the ratio of the overall weight of the fishing reel including the spool in ounces and the diameter of the spool in inches being on the order of approximately 3.75:1 or less for spool diameters of 2 inches or greater.

8. The fishing reel of claim 7 wherein the spool diameter is between 2 and 2.6 inches inclusive.

9. The fishing reel of claim 7 wherein the ratio of the overall weight of the fishing reel including the spool in ounces and the diameter of the spool in inches is on the order of approximately 4:1 or less for spool diameters between 2 and 2.6 inches (inclusive).

10. A lightweight, versatile fishing reel for carrying either light weight fishing line or heavy weight fishing line comprising:
    a reel body having a handle mounted to said reel body, said handle in operable engagement with a drive mechanism within said reel body;
    a mounting leg for attaching said reel body to a fishing pole;
    a rotor having a forward end and a back end at the forward end of said reel body;
    a rotating cup at the forward end of said rotor, said rotating cup including a bail pickup bracket;
    a line retrieval mechanism; and
    a spool mounted in a plane transverse to the plane of said reel body, said spool having an outer face, a central channel and a skirted inner face, the diameter of said outer face of said spool being greater than two and one quarter inches, the diameter of the outer face of said spool enabling said spool to accommodate either light weight test fishing line or heavy weight test fishing line, and the entire fishing reel having a weight of less than nine and one half ounces.

11. The fishing reel of claim 10 wherein said spool outer face has a diameter of greater than two inches and a weight of less than nine ounces.

12. The fishing reel of claim 10 wherein the drive mechanism comprises gears.

13. The fishing reel of claim 10 further including an anti-reverse mechanism.

14. The fishing reel of claim 10 wherein said spool is made of a graphite composite material.

15. The fishing reel of claim 10 wherein said spool is made of a lightweight metal alloy.

16. The fishing reel of claim 14 wherein the metal alloy contains aluminum.

17. The fishing reel of claim 14 wherein the metal alloy contains titanium.

18. The fishing reel of claim 10 wherein said gears are machine cut helical gears.

\* \* \* \* \*